US012412201B2

(12) United States Patent
DuBois (10) Patent No.: US 12,412,201 B2
(45) Date of Patent: Sep. 9, 2025

(54) AUTOMATED PRODUCT OFFERING (71) Applicant: FUJIFILM NORTH AMERICA CORPORATION, Valhalla, NY (US)

(72) Inventor: Charles L. DuBois, Rochester, NY (US)

(73) Assignee: FUJIFILM NORTH AMERICA CORPORATION, Valhalla, NY (US)

( * ) Notice: Subject to any disclaimer, the term of this patent is extended or adjusted under 35 U.S.C. 154(b) by 145 days.

(21) Appl. No.: 17/073,070

(22) Filed: Oct. 16, 2020

(65) Prior Publication Data
US 2021/0035176 A1  Feb. 4, 2021

Related U.S. Application Data

(62) Division of application No. 14/728,946, filed on Jun. 2, 2015, now Pat. No. 10,810,646.
(Continued)

(51) Int. Cl.
*G06Q 30/00* (2023.01)
*G06Q 20/18* (2012.01)
(Continued)

(52) U.S. Cl.
CPC ......... *G06Q 30/0621* (2013.01); *G06Q 20/18* (2013.01); *G06Q 30/0237* (2013.01);
(Continued)

(58) Field of Classification Search
CPC . G06Q 30/0601–0645; G06Q 30/0253; G06Q 20/18; G06Q 30/0237; G07F 17/26; G07F 9/023
See application file for complete search history.

(56) References Cited

U.S. PATENT DOCUMENTS 5,513,117 A    4/1996  Small
6,335,795 B1 *  1/2002  Neuhard ............... G06F 3/1205
                                                358/1.15
(Continued)

OTHER PUBLICATIONS

"Kodak Teams with Stationery Expert Bonnie Marcus to Make Mother's Day More Memorable: Stationery Designer to the Stars Creates Two Exclusive Mother's Day Photo Cards Available from Kodak Picture Kiosks in US," PR Newswire [New York], Apr. 30, 2013 (Year: 2013).*

(Continued)

*Primary Examiner* — Anne M Georgalas
(74) *Attorney, Agent, or Firm* — Womble Bond Dickinson (US) LLP (57) ABSTRACT

Automating a product offering presented in a consumer kiosk application for creating and order consumer photo-related products. An automated product offering system determines in real-time or near real-time the availability of products to be offered to the consumer and adjusts the display on the kiosk GUI to guide the user to select products that are currently available. The product availability may be specific to a location and a retailer hosting the consumer kiosk application. The kiosk GUI display is adjusted in accordance with product advertising and promotional campaigns to guide the user to generate orders for products that offer the best value to the consumer while helping retailers and kiosk operators succeed with advertising campaigns.

16 Claims, 10 Drawing Sheets

Related U.S. Application Data (60) Provisional application No. 62/006,793, filed on Jun. 2, 2014.

(51) Int. Cl.
    *G06Q 30/0207* (2023.01)
    *G06Q 30/0251* (2023.01)
    *G06Q 30/0601* (2023.01)
    *G07F 9/02* (2006.01)
    *G07F 17/26* (2006.01)

(52) U.S. Cl.
    CPC ..... *G06Q 30/0253* (2013.01); *G06Q 30/0603* (2013.01); *G06Q 30/0639* (2013.01); *G06Q 30/0643* (2013.01); *G07F 9/023* (2013.01); *G07F 17/26* (2013.01)

(56) References Cited

U.S. PATENT DOCUMENTS

| | | | |
|---|---|---|---|
| 6,915,273 B1* | 7/2005 | Parulski | H04N 1/32 |
| | | | 705/26.5 |
| 9,457,518 B2* | 10/2016 | Badhani | B29C 64/386 |
| 9,579,850 B2* | 2/2017 | Koreis | G06Q 20/085 |
| 9,588,726 B2* | 3/2017 | Webb | B33Y 50/00 |
| 9,902,109 B2* | 2/2018 | Kaltenbach | B29C 64/357 |
| 2002/0169675 A1 | 11/2002 | Helot et al. | |
| 2003/0163399 A1 | 8/2003 | Harper et al. | |
| 2003/0169576 A1 | 9/2003 | Kisu et al. | |
| 2003/0229538 A1* | 12/2003 | Nardozzi | G06Q 30/0641 |
| | | | 705/14.73 |
| 2004/0158499 A1* | 8/2004 | Dev | G06Q 30/02 |
| | | | 705/26.1 |
| 2004/0186783 A1* | 9/2004 | Knight | G06Q 20/20 |
| | | | 705/14.1 |
| 2005/0088693 A1 | 4/2005 | Schnoebelen et al. | |
| 2006/0287925 A1 | 12/2006 | Taylor et al. | |
| 2008/0015959 A1 | 1/2008 | Kruglikov et al. | |
| 2008/0235095 A1 | 9/2008 | Oles et al. | |
| 2010/0078474 A1* | 4/2010 | Rosenblatt | G06Q 30/02 |
| | | | 235/380 |
| 2011/0093344 A1* | 4/2011 | Burke | G06Q 30/06 |
| | | | 705/14.65 |
| 2011/0101667 A1* | 5/2011 | Alizieri | B42D 1/00 |
| | | | 281/15.1 |
| 2012/0092724 A1* | 4/2012 | Pettis | G06F 3/1204 |
| | | | 358/1.15 |
| 2013/0006916 A1 | 1/2013 | McBride et al. | |
| 2013/0036018 A1 | 2/2013 | Dickerson | |
| 2013/0073468 A1 | 3/2013 | Maskatia et al. | |
| 2013/0074714 A1 | 3/2013 | Asbury et al. | |
| 2015/0015919 A1* | 1/2015 | Anderson | A23G 3/28 |
| | | | 358/3.27 |
| 2015/0081416 A1* | 3/2015 | Ringo | G06Q 30/0268 |
| | | | 705/16 |
| 2015/0088307 A1* | 3/2015 | Ackerman | G06Q 10/087 |
| | | | 700/241 |

OTHER PUBLICATIONS

Johnson, Matthew, "Hokies create e-greeting card machine", collegiatetimes.com, Jan. 23, 2014, 2 pages.
Non-Final Office Action received for U.S. Appl. No. 18/487,932, mailed on Jul. 18, 2024, 15 pages.
Notice of Allowance received for U.S. Appl. No. 18/487,932, mailed on Feb. 3, 2025, 4 pages.
Notice of Allowance received for U.S. Appl. No. 18/487,932, mailed on Jan. 2, 2025, 13 pages.

* cited by examiner

AUTOMATED PRODUCT OFFERING

CROSS REFERENCE TO RELATED APPLICATIONS

This present application is a divisional of and claims the benefit of U.S. patent application Ser. No. 14/728,946, filed on Jun. 2, 2015 and entitled "Automated Product Offering", which claims benefit under 25 USC 119(e) of U.S. Provisional Application No. 62/006,793, filed Jun. 2, 2014, entitled "Automated Product Offering for Photo Editing and Printing Kiosk User Interface."

FIELD OF THE INVENTION

Embodiments of the present invention relate generally to consumer photography. More particularly, embodiments of the invention relate to application software for ordering photographic prints and related products.

BACKGROUND

Today there are numerous services available which provide self-serve retail kiosks to customers to generate orders for photographic prints and related consumer products using their digital photographs or images. Generally the kiosk software provides a user-friendly graphical user interface (GUI) to guide the user to request and specify the details of their orders. For example, the user may be guided to request photographic prints in particular sizes suitable for the resolution of their digital photograph, or presented with any number of related products for incorporating the digital photograph or image, such as a mug, photo cube, keychain, album, calendar, custom puzzle, and the like.

As with any consumer product, however, the exact product that the customer wishes to order may not always be immediately available. For example, the printers that produce the photographs may not have the proper size media loaded or available, or the mugs may be back-ordered during a busy holiday season and so-forth. Because the customers invest valuable time and energy into using the kiosk to request and customize their orders, it can be frustrating to find out that the particular product that the customer wants to order is not currently available.

SUMMARY

To provide the customer with the best possible service, embodiments of the present invention are directed to methods and systems for automating a product offering presented in a consumer kiosk application for creating and order consumer photo-related products. An automated product offering system determines in real-time or near real-time the availability of products to be offered to the consumer prior to presenting the products on the consumer kiosk application's graphical user interface (GUI).

In one embodiment the automated product offering system displays on the kiosk GUI only those products that are currently available. In one embodiment the automated product offering system adjusts the display of a product on the kiosk GUI with an anticipated date that the product will be available or an alternate location from which the product is available should the customer be willing to wait for the order to be fulfilled. In one embodiment the product availability is specific to any one or more of a location and a retailer hosting the consumer kiosk application.

In one embodiment, the automated product offering system adjusts the display of a product on the kiosk GUI with product advertising information. In one embodiment the product advertising information with which the display of the product is adjusted includes local advertising promotions specific to any one of a location and a retailer hosting the consumer kiosk application. In one embodiment the product advertising information is displayed in any one of a screen saver, splash screen, ticker and the like on the kiosk GUI in advance of or commencing with customer activation of the kiosk GUI. In one embodiment the product advertising information is used to adjust the display of those products that are currently available.

In one embodiment, the automated product offering system includes a local setup GUI to set local parameters affecting product availability and promotions, including local hours, local product availability, local promotions, branding and the like.

BRIEF DESCRIPTION OF THE DRAWINGS

Embodiments of the invention are illustrated by way of example and not limitation in the figures of the accompanying drawings in which like references indicate similar elements.

DETAILED DESCRIPTION

Various embodiments and aspects of the invention will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" means that a particular feature, structure, or characteristic described in conjunction with the embodiment can be included in at least one embodiment of the invention. The appearances of the phrase "in one embodiment" in various places in the specification do not necessarily all refer to the same embodiment.

In a typical scenario of an embodiment of an auto product offering system a retail store may provide customers with a self-serve kiosk to allow a customer to request and specify orders for photographic products offered locally in the retail store or offered remotely from the retailer's other stores or from third party providers. In order to fulfill a photographic print order locally, for example, the retail store may have a print service located in the store with one or more photographic printers capable of printing on-demand a variety of photographic prints and print-related products.

The photographic printers may be connected locally or through a network to the kiosk. Some specialty products may only be fulfilled remotely by placing the orders with a photo product service that provides the specialty products, such as photo cubes, mugs, and the like. Information about the availability of the photographic products may therefore be determined locally, or may have to be determined from the remote providers of those products, such as the retailer's other stores and/or the third party providers.

In one embodiment, a product catalog server serves as a central repository for the customers to access the various products on offer from the retail store using the retailer's self-service kiosk. When a customer wishes to order any one of the products from the local or remote product providers, the customer can do so by interacting with the kiosk application software via the kiosk GUI.

Thus, according to one embodiment, the automated product offering system operates in conjunction with the retailer's self-service kiosk application software to present the customer with the retailer's products that are currently available and not present the products that are not available. In one embodiment, the unavailable products may be presented with additional information, including any one or more of anticipated availability and alternate availability from another location or via direct shipment to the customer.

In one embodiment, the automated product offering system periodically queries the availability of products offered by the retailer and updates the presentation of the retailer's product catalog product offerings on the kiosk prior to initiating a next customer order. In one embodiment, the automated product offering system periodically queries the advertising and/or promotion of products offered by the retailer and updates the presentation of the retailer's product catalog product offerings on the kiosk prior to initiating a next customer order.

Figure 1:
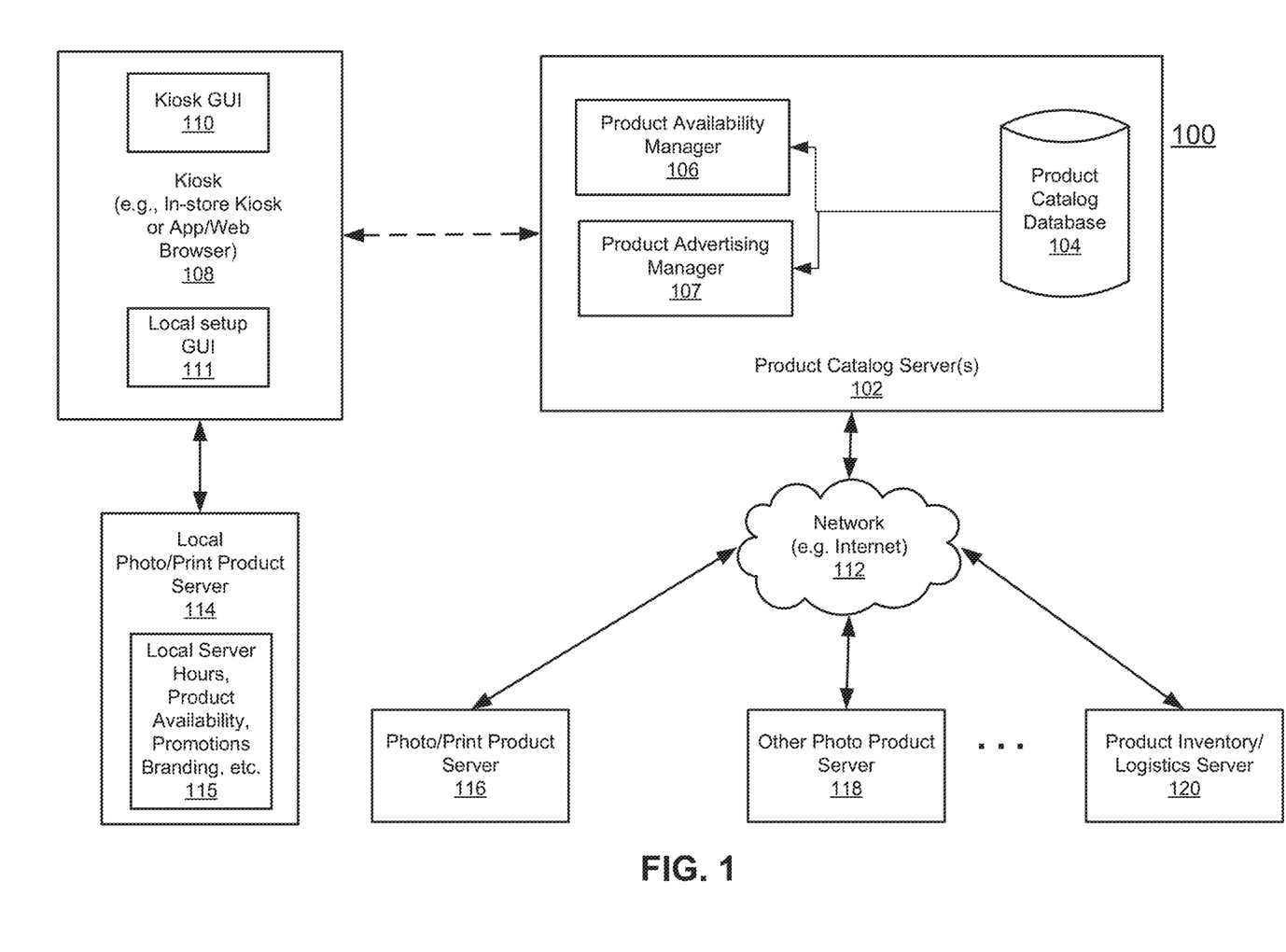
FIG. 1 is a block diagram illustrating an automated product offering system for a consumer kiosk according to one embodiment of the invention.

FIG. 1 is a block diagram illustrating an automated product offering system 100 according to one embodiment of the invention. Referring to FIG. 1, system 100 includes a product catalog server 102 to manage, on behalf of a variety of product servers, the availability of the retailer's products as presented to a kiosk 108 using the kiosk graphical user interface (GUI) 110. In one embodiment the kiosk 108 may be hosted on a customer's device, such as in a browser platform of a personal computer, laptop, cellphone, or other type of stationary or mobile device. The product servers may include one or more local photo/print product servers 114 that manage, usually via a local area network or other local connection, the local in-store print devices used to produce the photo/print products. The product servers may also include servers accessible remotely accessible over an internet network 112, such as a photo/print product server 116 in another one of the retailer's stores, and/or other specialty photo product servers 118. In one embodiment the product servers 114/116/118 include product servers that route and specify print jobs in accordance with product characteristics selected by the customer as described in the commonly assigned U.S. patent application Ser. No. 13/628,741, published as US 2013/0074714, the content of which is incorporated herein by reference.

During operation, the product catalog server 102 manages the availability of products using a product catalog database 104 containing information about every possible product offered by the retailer. A product availability manager 106 periodically generates queries against the product servers 114/116/118 to determine whether and when particular products are or may become available. In one embodiment, the product catalog server 102 can remotely access a product inventory logistics server 120 to better anticipate future product availability.

In one embodiment, the product catalog server 102 serves the information about the availability of the products in the product catalog database 104 to the kiosk 108 so that the kiosk GUI 110 may be adjusted to either hide from view those products that are currently unavailable, or to adjust the view of the products to indicate when they are anticipated to become available. including overlaying or other adding text information to the display, the text information indicating when they are anticipated to become available. In one embodiment, the products may be ranked in terms of availability such that those products that are not currently available, or those whose inventory is low, are displayed less prominently than those products that are currently available or those whose inventory is high. In this manner, the customer using the kiosk 108 can be guided via the kiosk's GUI 110 to make a product choice that is more likely to be fulfilled in a prompt and efficient manner.

In one embodiment, a product advertising manager 107 operates in conjunction with the product availability manager 106 to determine whether and when advertising and/or promotions are used to adjust the display of promoted products, or otherwise advertised or featured products on the kiosk GUI 110. The product advertising and/or promotion information may be stored locally, such as in local server 114, or remotely, such as in servers 102/116/118 or may be otherwise served from the product catalog server 102 in conjunction with the product inventory/logistics server 120.

The product catalog server 102 serves the information about the advertising and/or promotions of the products in the product catalog database 104 to the kiosk 108 so that the kiosk GUI 110 may adjust the view of the products to include the product advertising and/promotions. In one embodiment, the product advertising and/or promotion information is used to adjust the view by adjusting an order of display of promoted products such that those products currently advertised, or those being currently promoted, are displayed more prominently than those products that are not currently being advertised or promoted. In one embodiment, the product advertising and/or promotion information is used to adjust the view by overlaying the product advertising and/or promotion information on the display proximate to the promoted product, such as by indicating text information about the product's promotion. In this manner, the customer using the kiosk 108 can be further guided via the kiosk's GUI 110 to make a product choice that provides the best value to the customer and/or supports location host and/or retailer marketing and sales campaigns.

In one embodiment, the local server 114 includes local parameters 115 set using a local setup GUI 111 provided by the automated product offering system 100, where the local setup GUI 111 is typically available on the kiosk 108 or on a browser platform of a stationary or mobile computing device operated by the retailer and/or location hosting the kiosk 108. The local setup GUI 111 allows the retailer or operator of the location hosting the kiosk 108 to set the local parameters, such as retail hours and local product availability, advertising, promotions, branding and the like.

Figure 2:
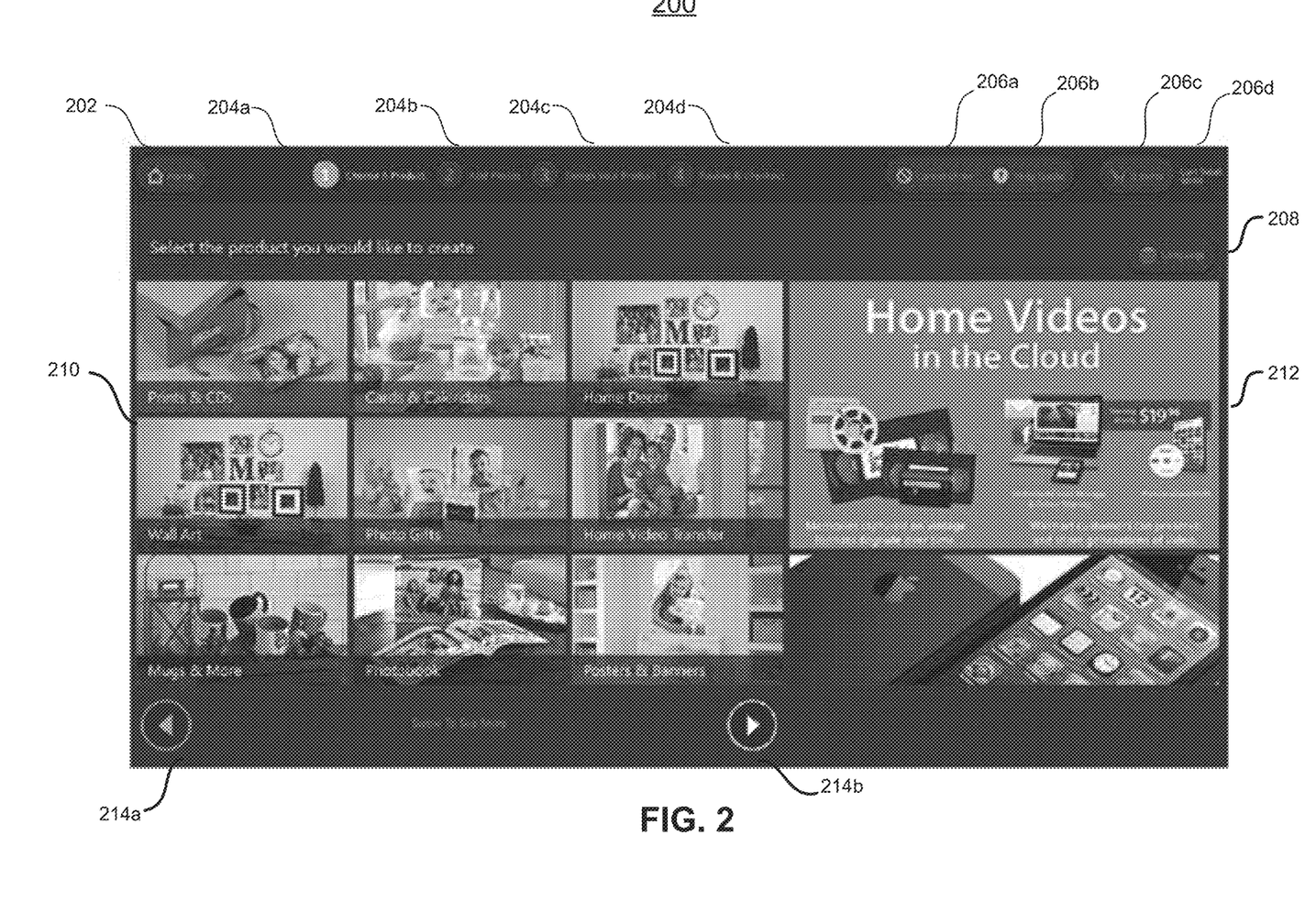
FIG. 2 is an example illustration of a graphical user interface for presenting products offered in a consumer kiosk according to another embodiment of the invention.
Figure 3:
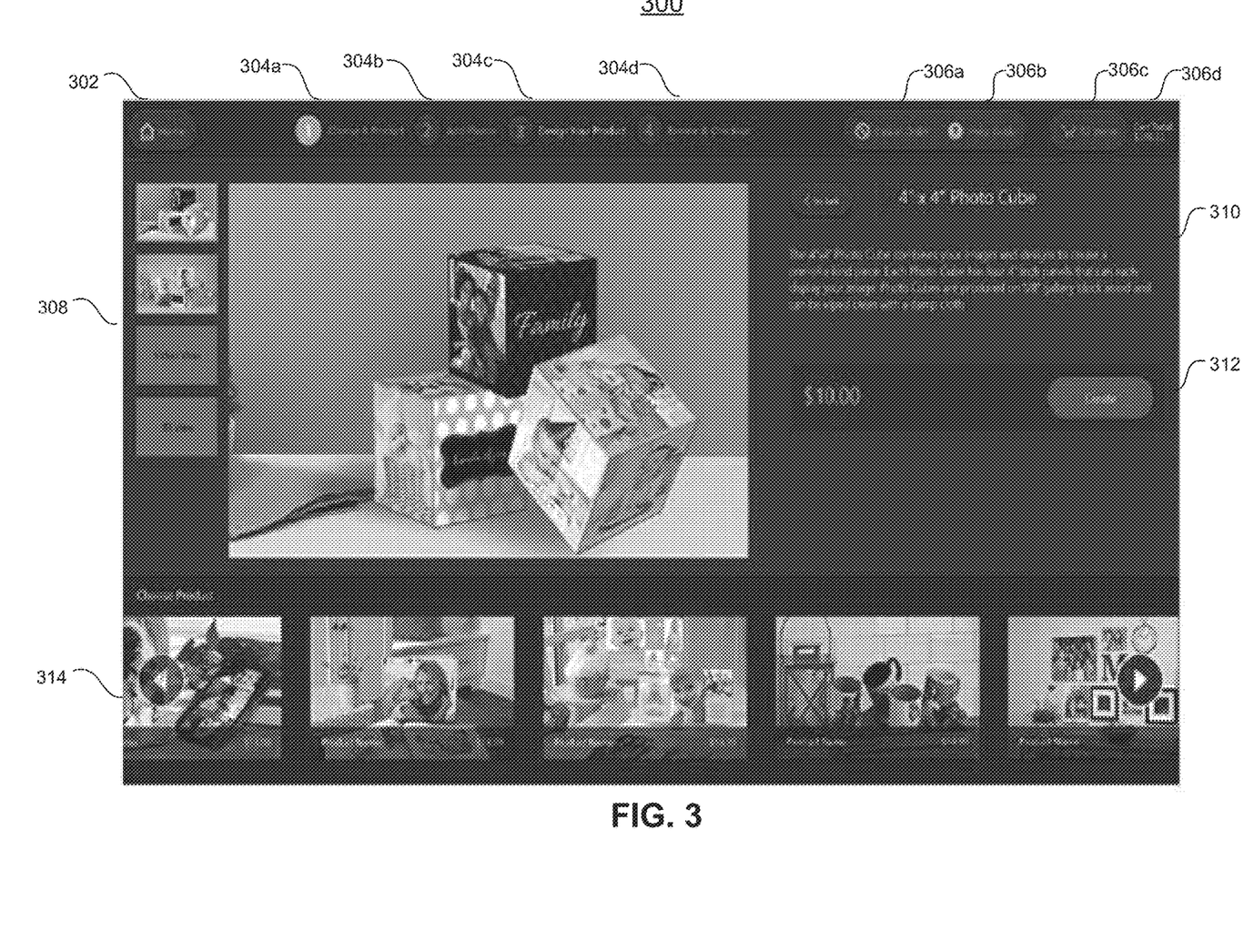
FIG. 3 is another example illustration of a graphical user interface for presenting products offered in a consumer kiosk according to another embodiment of the invention.

FIGS. 2 and 3 illustrate examples of a kiosk GUI 110 that may be modified in accordance with an embodiment of the invention. For example, in FIG. 2, the tiled display 202 of product offerings includes order customization navigational aids 204a-d, order transaction navigation aids 206a-d, GUI customization aids, such as language selection 208, tiled product selection images 210, featured product category images 212, and product selection navigation aids 214a-b.

In one embodiment, the tiled display 202 may be adjusted to eliminate from the tiled product selection images 210 those product offerings that are not currently available. Alternatively, the tiled product selection images 210 of a selected product offering may be displayed either before or after selection with an indication of delayed availability to alert the customer that the product may be backordered or otherwise currently unavailable, such as with a text overlay on the image 210 or other visual display indicator associated with the image 210.

In one embodiment the display of the featured product category images 212 may be adjusted by the automated product offering system 100 to reflect any advertising and/or promotions associated with the product or product category, including adjusting which of the available products are displayed in the featured product display area, and displaying additional visual or text information alerting the customer to the advertising and/or promotion.

In FIG. 3, a detailed display of a product offering may provide further details on the availability of the product. For example, the detailed display 302 of product offerings includes order customization navigational aids 304a-d, order transaction navigation aids 306a-d, product descriptions 310, and product creation buttons 312, additional images 308 associated with the product offering on display, and a scrolling display of other product selection images 314 that depict alternative product offerings that are available (or soon to be available), including products that are determined to be of particular interest to the customer based on their prior interactions with the kiosk GUI 110. In one embodiment, the product selection images 314 are displayed along the bottom of the GUI 110, and may be adjusted to eliminate or modify the display of those product offerings that are not currently available, or may be adjusted to reflect any advertising and/or promotional information associated with the product offering depicted in the product selection images 314.

Figure 4:
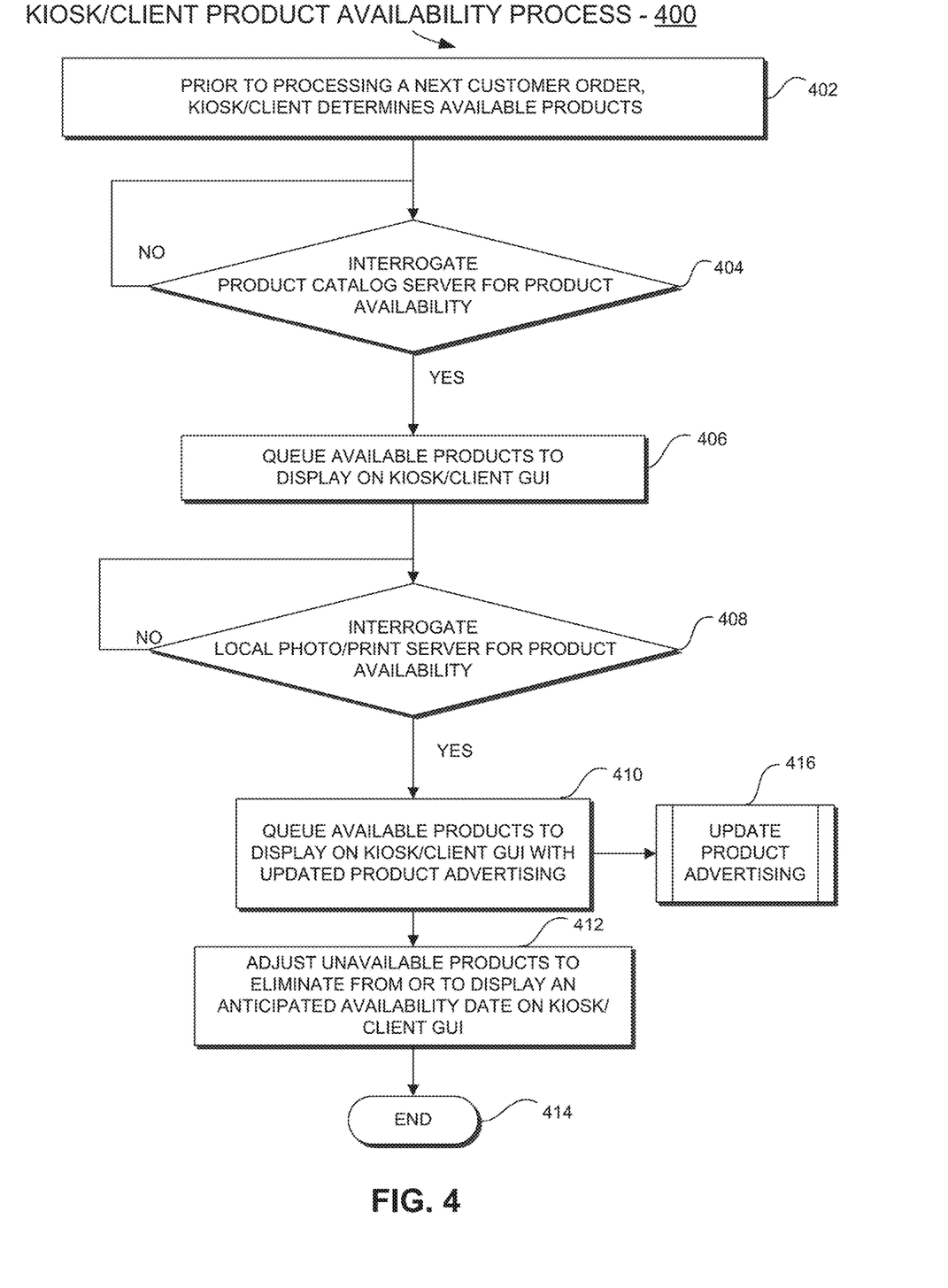
FIG. 4 is a flow diagram illustrating a process for determining product availability for products offered in a consumer kiosk according to one embodiment of the invention.

FIG. 4 is a flow diagram illustrating a method for a process 400 of determining product availability for a kiosk 108 according to one embodiment of the invention. For example, process 400 may be performed by product availability manager 106 of product catalog server 102 operating in conjunction with the kiosk 108 of FIG. 1. Referring to FIG. 4, at block 402, prior to processing a next customer order, the kiosk 108 initiates a request to the product availability manager 106 to determine the available products to present on the kiosk GUI 110. At decision block 404, the kiosk 108 queries the product availability manager 106 which, in turn, queries the remote product servers 116/118 as to the status of product availability. If a product is determined to be available, then at block 406, the product is queued for display on the kiosk GUI 110. If a product is determined to be unavailable, then the query at block 404 continues for the next product until all products for which availability has been requested is determined.

In one embodiment, at decision block 408, the kiosk 108 queries the local photo/print server(s) 114 for product availability. If a product is determined to be available, then at block 406, the product is queued for display on the kiosk GUI 110. If a product is determined to be unavailable, then the query at block 408 continues for the next product until all products for which availability has been requested is determined.

In one embodiment, at block 410, the available products are queued for display on the kiosk GUI 110. In one embodiment, the display on the kiosk GUI 110 is adjusted to reflect updated product advertising, including any retailer and/or location host advertising, promotions and branding associated with the product. The updated product advertising process 416 is invoked periodically or as needed to ensure that the latest advertising and promotional information is presented for display on the kiosk GUI 110.

In one embodiment, at block 412, for all of the products that are determined to be unavailable, the presentation of the products on the kiosk GUI 110 is adjusted to display an anticipated availability date on the kiosk GUI 110 instead of not adding them to the queue of displayed products.

Figure 5:
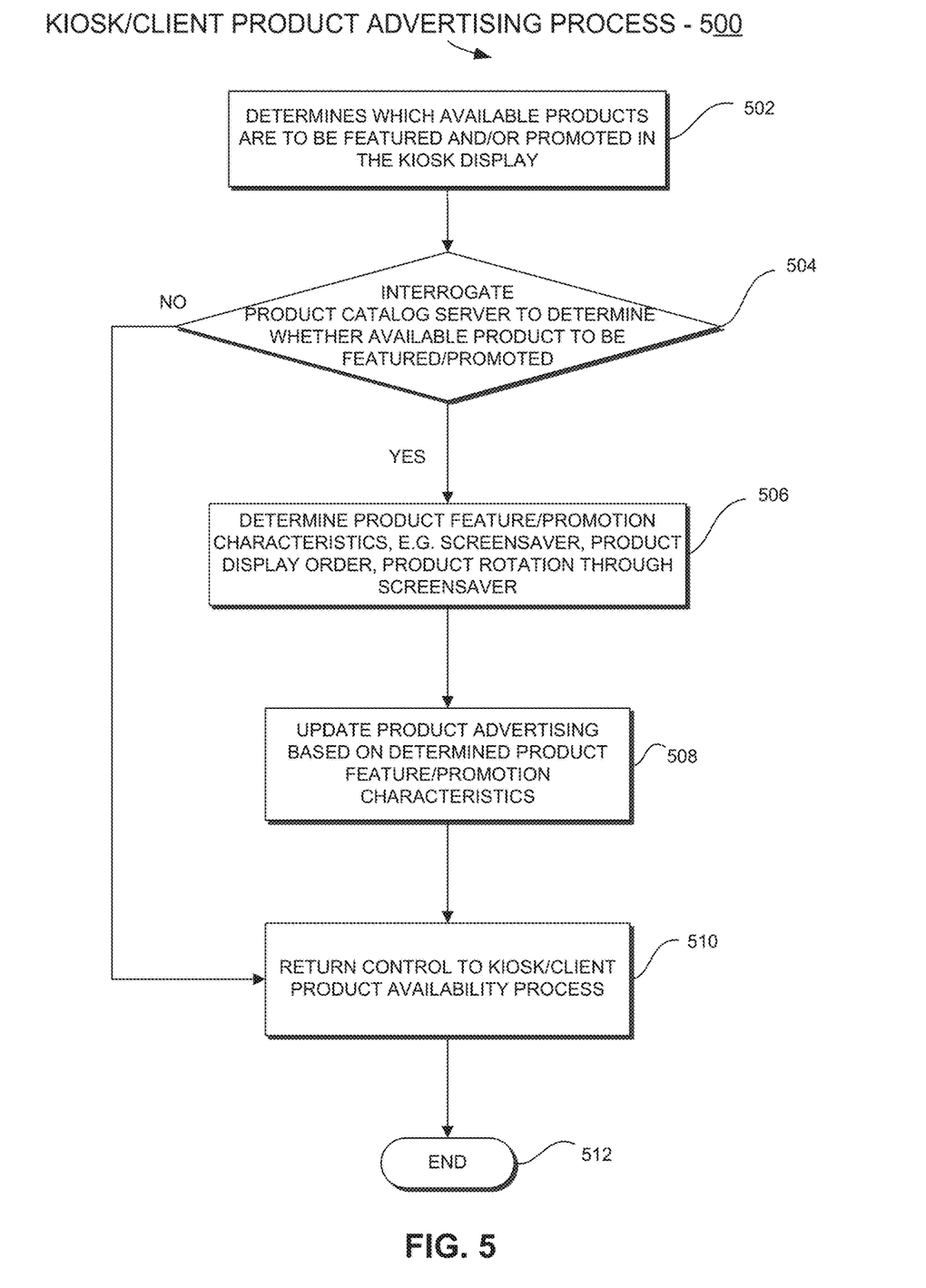
FIG. 5 is a flow diagram illustrating a process for determining product advertising for products offered in a consumer kiosk according to one embodiment of the invention.

FIG. 5 is a flow diagram illustrating a method for a process 500 of determining product advertising and/or promotion information for available products for a kiosk 108 according to one embodiment of the invention. For example, process 500 may be performed by product advertising manager 107 of product catalog server 102 operating in conjunction with the product availability manager 106 and kiosk 108 of FIG. 1.

In one embodiment, the process 502 determines which of the available products are to be featured and/or promoted in the kiosk GUI 110 in accordance with current advertising and/or promotion information. For example, at decision block 504, the process interrogates the product catalog server 102 to determine whether a particular product is to be featured/promoted. Alternatively, or in addition, the process 500 performs decision block 504 in conjunction with other sources of advertising/promotion information, such as servers 114/116/118 and product inventory/logistics server 120.

In one embodiment, the process 500 continues, after determining that a particular product is to be featured/promoted, at process 506 to determine the characteristics of the product feature/promotion to be displayed on kiosk GUI 110. For example, the product may be featured or promoted in a screensaver rotation on the kiosk GUI 110 along with other featured/promoted products, or it could be splashed on the kiosk GUI 110 whenever a customer in the retailer/host location accesses the kiosk 108, or activates the kiosk GUI 110 on the customer's personal device's browser display.

At process 508, the product advertising within the product selection interfaces, such as those illustrated in FIGS. 2-3, is updated in accordance with the determined feature/promotion characteristics. For example, the process 508 updates the sequencing of the product display and/or adds overlays to alert the customer to the current host location and/or retailer advertising and promotions associated with the product. At process 510, control of the kiosk GUI 110 is returned to the product availability process 400.

Figure 6:
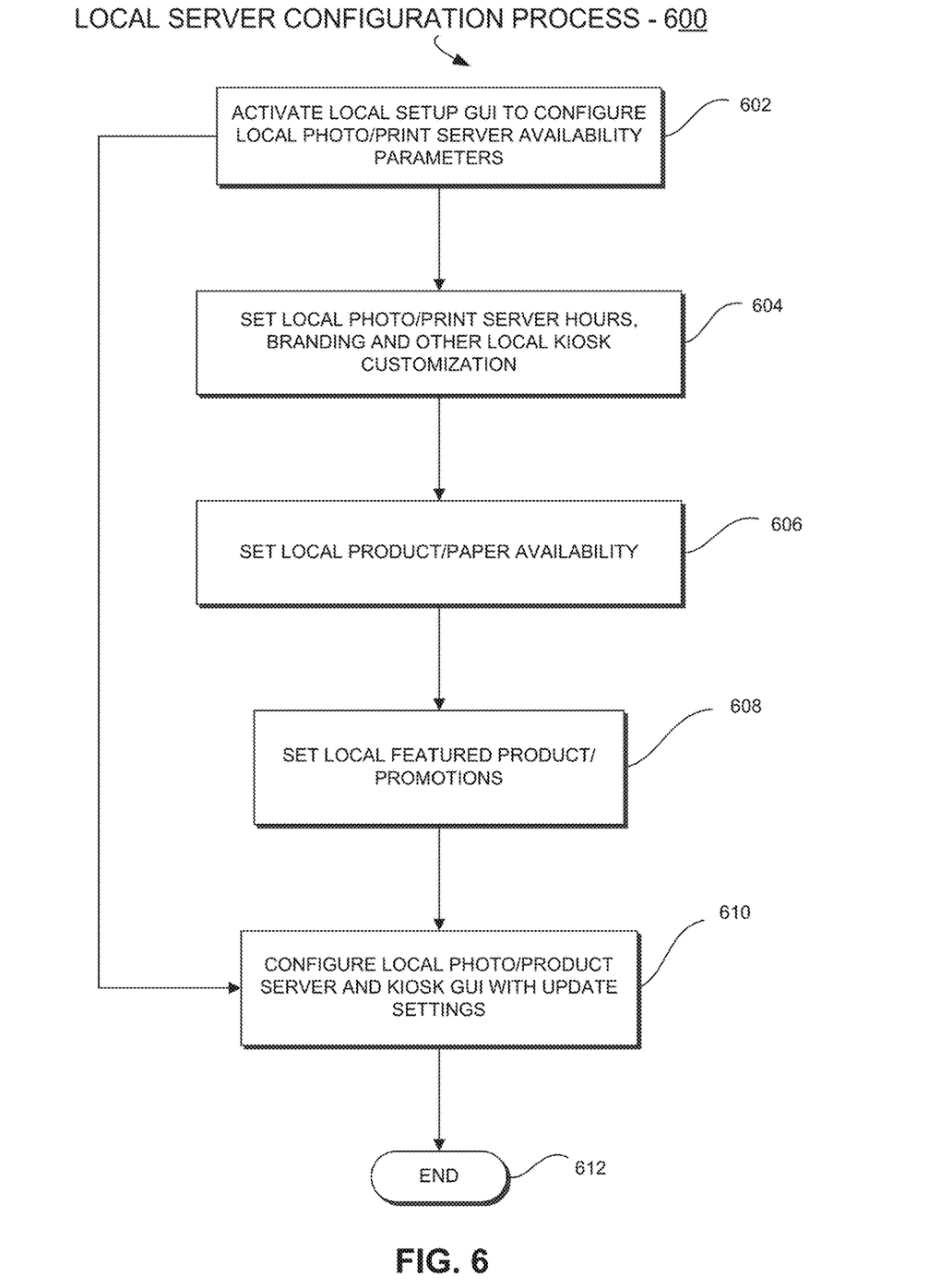
FIG. 6 is a flow diagram illustrating a process for setting local availability and advertising for products offered in a consumer kiosk according to one embodiment of the invention.

Turning now to FIG. 6, a local server configuration process 600 is illustrated in which the kiosk 108 host location operator or retailer activates 602 a local setup GUI 111 either on the kiosk 108 or on another device having a platform to support the local setup GUI 111. The host location operator or retailer proceeds at 602 to configure the local or retailer-based photo print/server availability parameters for use by the automated product offering system 100 in conjunction with the kiosk 108 and local photo/print product server 114.

At process 604, the host location operator or retailer sets the local photo/print server hours, branding and other local kiosk 108 customization. At process 606, the host location operator or retailer sets the local product/paper availability, and at process 608 sets the local featured products/promotions/advertising campaigns.

Upon completing the local setup processes 602-608, the process 600 uses the settings to configure the local photo/product server and kiosk 108, and kiosk GUI 110 with the updated settings. For example, the process 600 stores the settings on the local server's parameter store 115. This process 600 may be repeated as needed to maintain various settings, such as the retailer/local host's current operating hours, local product availability and advertising/promotional campaigns and the like. In one embodiment, the process 600 is carried out using the local setup GUI 111 as illustrated in FIGS. 7-9 below.

Figure 7:
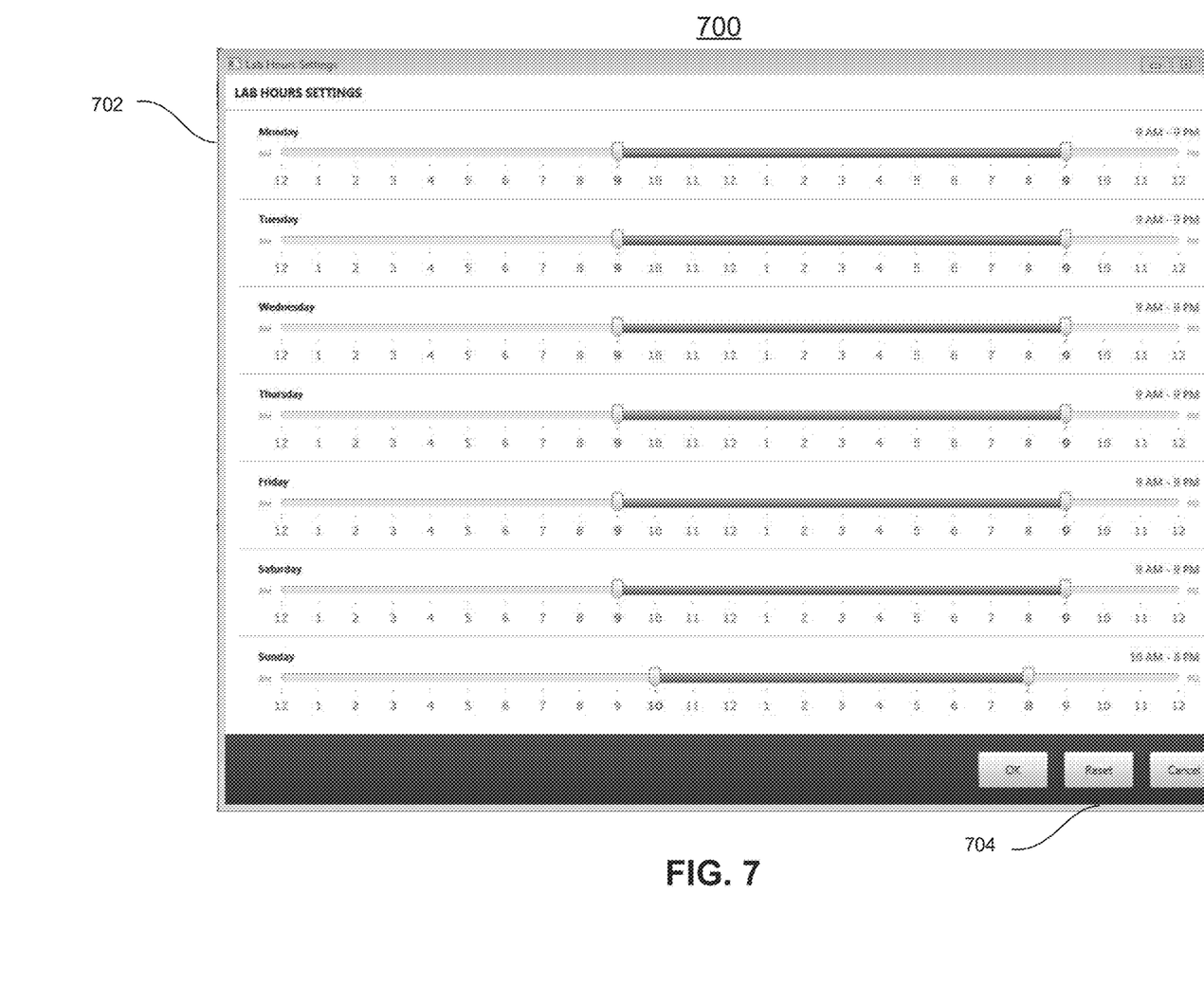
FIGS. 7-9 are example illustrations of a graphical user interface for setting local availability and advertising for products offered in a consumer kiosk according to one embodiment of the invention.
Figure 8:
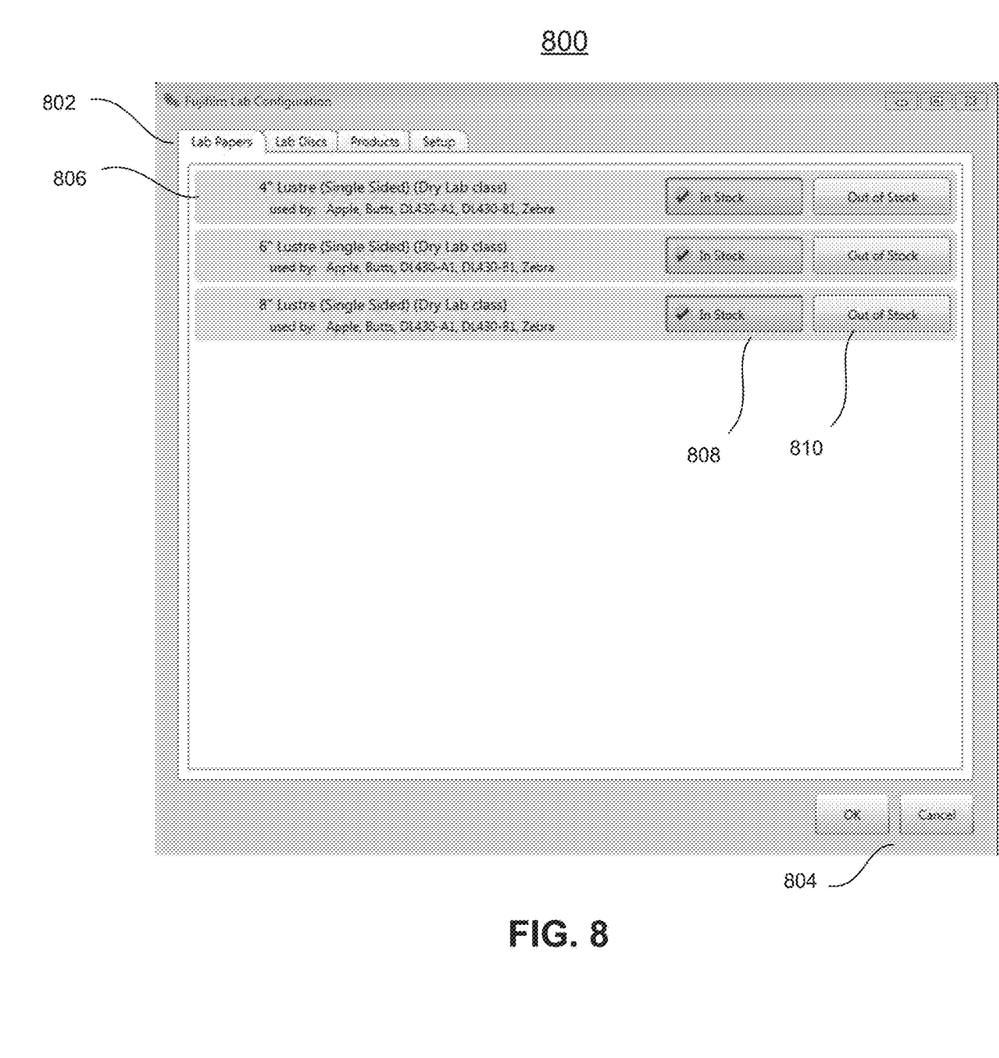
Figure 9:
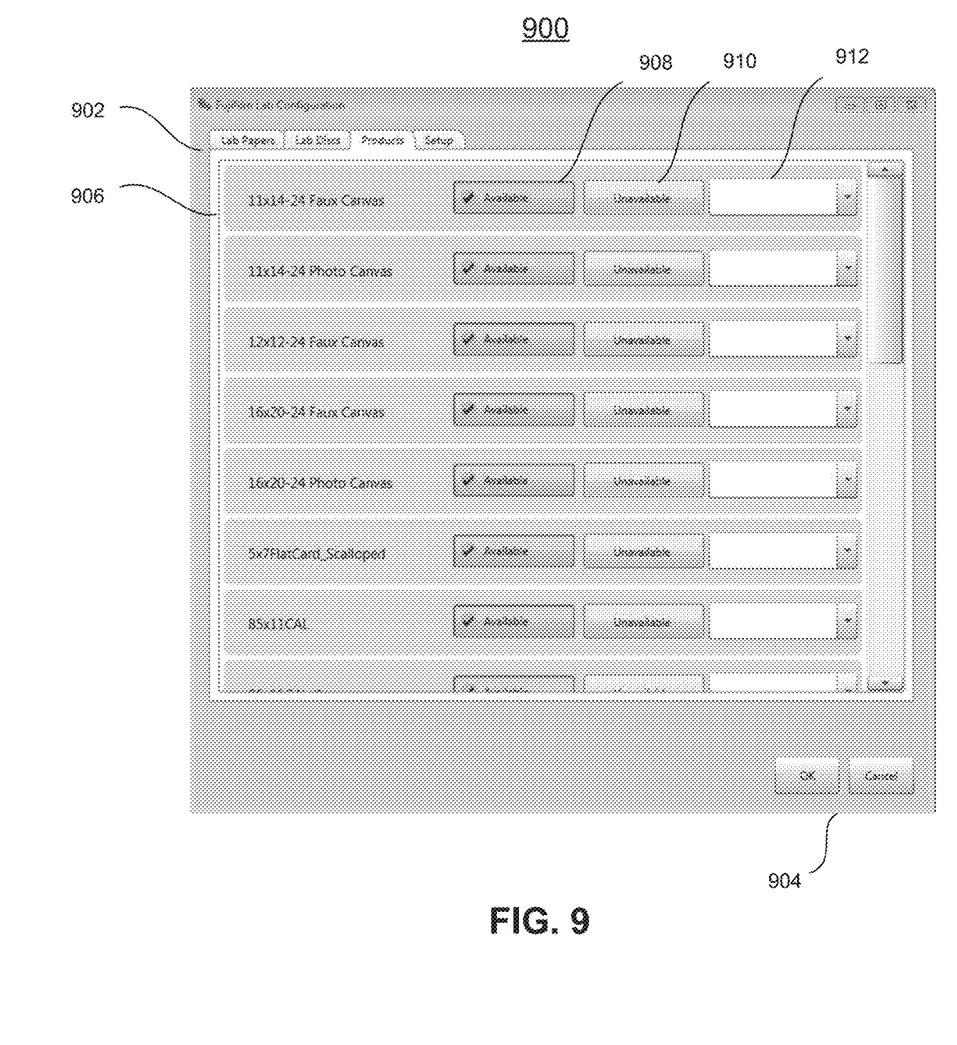

FIGS. 7-9 illustrate examples of a local setup GUI 111 that may be modified in accordance with an embodiment of the invention. For example, as illustrated in FIG. 9, the a lab hour settings interface 702 provides navigational setting buttons 704 and a graphical day-of-the-week slider bar interface that facilitates the setting of hours of operation for the photo/print lab servicing a particular retailer and/or host location for the kiosk 108.

FIGS. 8-9 each illustrate embodiments of a tabbed GUI interface for GUI 111 for other local settings such as the available papers, discs, and other specialty products that are stocked at that location. For example, in FIG. 8, the lab papers tabbed interface 802 includes selections for different sizes of photo papers 806 and "in stock" and "out of stock" command buttons to set the availability of those photo papers at that location. Similarly, the products tabbed interface 902 illustrated in FIG. 9, includes selections for various types of card stock and specialty canvas media 906 and "available" and "unavailable" command buttons to set the availability of those products at that location. The activation of each of the tabbed interfaces 802 and 902 are further controlled by the command buttons "OK" and "Cancel" 904 so that the operator of the GUI 111 either save or discard the selected settings of each tab.

Figure 10:
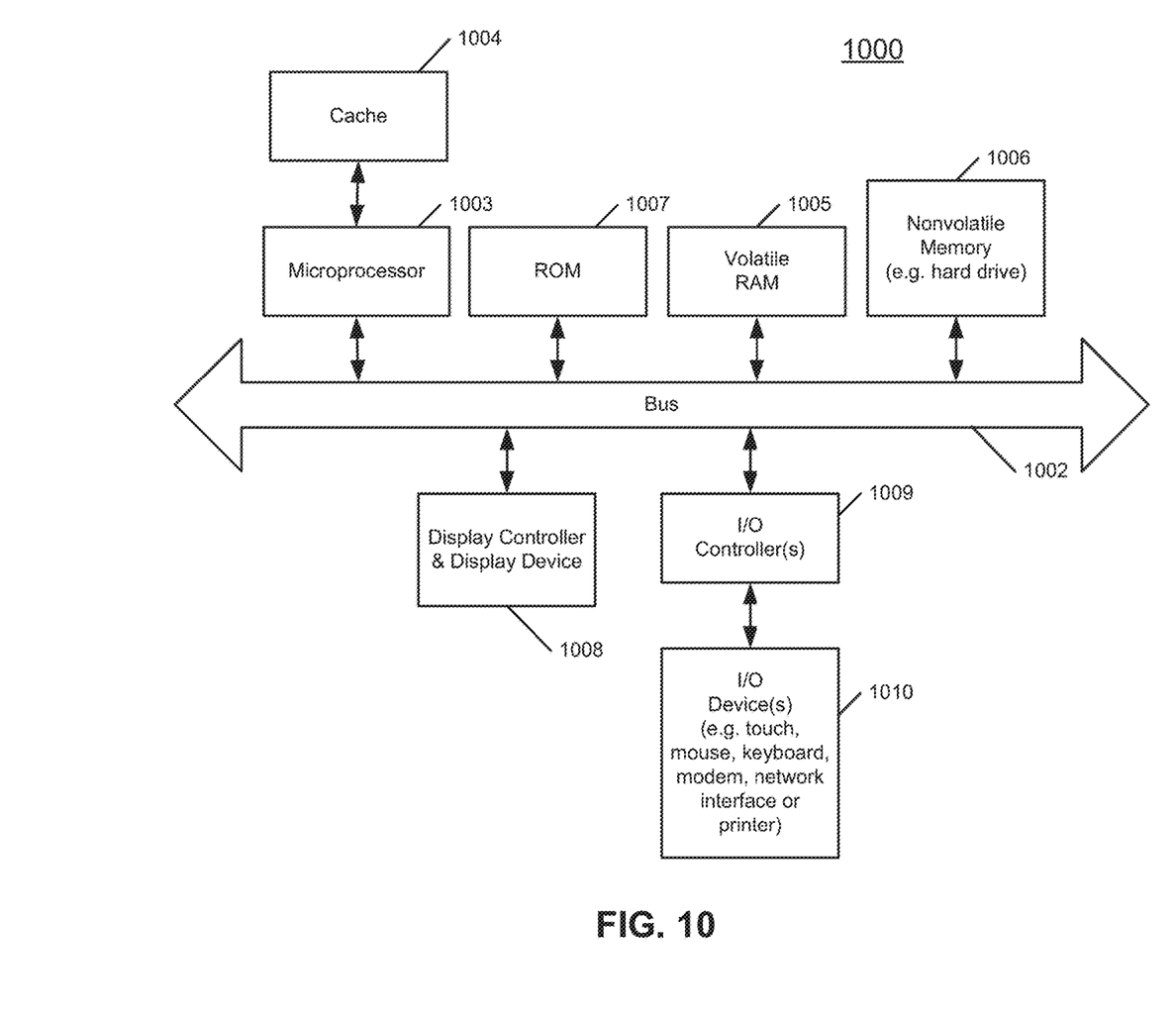
FIG. 10 is a block diagram of a data processing system, which may be used to implement an automated product offering system for a consumer kiosk according to one embodiment of the invention.

FIG. 10 is a block diagram of a data processing system, which may be used with one embodiment of the invention. For example, the system 1000 may be used as a client or a server as shown in FIG. 1. Note that while FIG. 10 illustrates various components of a computer system, it is not intended to represent any particular architecture or manner of interconnecting the components; as such details are not germane to the present invention. It will also be appreciated that network computers, handheld computers, cell phones and other data processing systems which have fewer components or perhaps more components may also be used with the present invention.

As shown in FIG. 10, the computer system 1000, which is a form of a data processing system, includes a bus or interconnect 1002 which is coupled to one or more microprocessors 1003 and a ROM 1007, a volatile RAM 1005, and a non-volatile memory 1006. The microprocessor 1003 is coupled to cache memory 1004. The bus 1002 interconnects these various components together and also interconnects these components 1003, 1007, 1005, and 1006 to a display controller and display device 1008, as well as to input/output (I/O) devices 1010, which may be mice, keyboards, modems, network interfaces, printers, and other devices which are well-known in the art.

Typically, the input/output devices 1010 are coupled to the system through input/output controllers 1009. The volatile RAM 1005 is typically implemented as dynamic RAM (DRAM) which requires power continuously in order to refresh or maintain the data in the memory. The non-volatile memory 1006 is typically a magnetic hard drive, a magnetic optical drive, an optical drive, or a DVD RAM or other type of memory system that maintains data even after power is removed from the system. Typically, the non-volatile memory will also be a random access memory, although this is not required.

While FIG. 10 shows that the non-volatile memory is a local device coupled directly to the rest of the components in the data processing system, the present invention may utilize a non-volatile memory which is remote from the system; such as, a network storage device which is coupled to the data processing system through a network interface such as a modem or Ethernet interface. The bus 1002 may include one or more buses connected to each other through various bridges, controllers, and/or adapters, as is well-known in the art. In one embodiment, the I/O controller 1009 includes a USB (Universal Serial Bus) adapter for controlling USB peripherals. Alternatively, I/O controller 1009 may include an IEEE-1394 adapter, also known as FireWire adapter, for controlling FireWire devices.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the invention also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present invention are not described with reference to any particular programming language. It will be appreciated that a variety of programming languages may be used to implement the teachings of embodiments of the invention as described herein.

In the foregoing specification, embodiments of the invention have been described with reference to specific exemplary embodiments thereof. It will be evident that various modifications may be made thereto without departing from the broader spirit and scope of the invention as set forth in the following claims. The specification and drawings are, accordingly, to be regarded in an illustrative sense rather than a restrictive sense.

What is claimed is:

1. An auto product offering computer system for facilitating a selection of a photo-customized product, the system comprising:
    a consumer kiosk having a graphical user interface on a display device for selecting a photo-customized product, the consumer kiosk in communication with a catalog server having a catalog of photo-customizable products from which to select;
    a remote product server in communication with the catalog server, the remote product server fulfilling orders for the photo-customizable products, the orders placed by users of the consumer kiosk;
    a processor coupled to the consumer kiosk and the catalog server operating a product availability manager to determine whether products are available for fulfillment from the remote product server;
    a local product server in communication with the consumer kiosk; and
    wherein the processor is configured to:
        obtain a local availability of a first photo-customized product indicating whether or not the first photo-customized product is available at the local product server and first settings of the local product server indicating whether or not one or more media items to print onto the first photo-customized product are loaded into an equipment and the equipment to print the one or more media items onto the first photo-customized product is available;
        display the graphical user interface including a first product representation that is configured for the users of the consumer kiosk to select the first photo-customized product, if the first photo-customized product is available at the local product server, the first settings of the local product server indicate that the one or more media items are loaded into the equipment, and the equipment to print the one or more media items on the first photo-customized product is available, and
        display the graphical user interface including a second product representation for the users of the consumer kiosk to select a second photo-customized product that is other than the first photo-customized product, if the first photo-customized product is not available at the local product server, the first settings indicate that at least one of the one or more media items to print onto the first photo-customized product is not loaded into the equipment or the equipment to print the one or more media items onto the first photo-customized product is not available,
        wherein the processor is further operating a product advertising manager that is configured to:
        periodically determine if the first photo-customized product is eligible for at least one of promotions or advertising to the users of the consumer kiosk from second settings of the local product server indicating whether or not the first photo-customized product is eligible for the at least one of promotions or advertising;
        display an updated graphical user interface including a third product representation including at least one of promotions or advertising information with the first product representation if the second settings of the local product server indicate that the first photo-customized product is eligible for the at least one of promotions or advertising; and
        display the graphical user interface including the first product representation if the second settings of the local product server indicate that the first photo-customized product is not eligible for the at least one of promotions or advertising,
        wherein the processor is configured to:
    receive, via one of the graphical user interface or the updated graphical user interface, a user selection of the first product representation; and
    print the one or more media items onto the first photo-customized product at the equipment in response to the user selection of the first product representation.

2. The auto product offering computer system of claim 1, wherein the local product server is configured to fulfill the orders for the photo-customizable products at or near a location of the consumer kiosk; and
    wherein the processor is configured to:
    prior to obtaining the local availability, obtain a first availability of the first photo-customized product indicating that the first photo-customized product is available at the remote product server;
    override the first availability of the first photo-customized product with the local availability when the local availability indicates that the first photo-customized product is available at the local product server, the first settings of the local product server indicate that the one or more media items are loaded into the equipment and the equipment to print the one or more media items onto the first photo-customized product is available; and
    adjust the graphical user interface to print the one or more media items onto the first photo-customized product that is locally available.

3. The auto product offering computer system of claim 1, wherein the graphical user interface of the consumer kiosk is operable on a mobile device operated by a user of the consumer kiosk, the mobile device in communication with any one or more of the catalog server and the local product server.

4. The auto product offering computer system of claim 1 wherein the consumer kiosk is operable to receive an order for the first photo-customized product using the graphical user interface (GUI).

5. The auto product offering computer system of claim 4 wherein the processor is configured to:

determine the local availability of the plurality of products including the first photo-customized product, based upon a local availability of elements necessary to locally generate the plurality of products of the product catalog;

display the plurality of products on the graphical user interface;

in response to determining that the first photo-customized product in the plurality of products is not locally available, displaying a message with the first photo-customized product on the graphical user interface indicating availability options or actions to obtain the first photo-customized product;

and receiving a plurality of parameter selections for printing the one or more media items onto the first photo-customized product.

6. The auto product offering computer system of claim 5, wherein the first photo-customized product is locally generated at the consumer kiosk located near the user, or the product is locally generated at a store near the consumer kiosk.

7. The auto product offering computer system of claim 6, wherein the graphical user interface indicates a location, different from the consumer kiosk and different from the store, where the selected first photo-customized product is currently available.

8. The auto product offering computer system of claim 5, wherein an action that a user can take is to obtain assistance from a store that manages the consumer kiosk.

9. The auto product offering computer system of claim 5, wherein the product catalog indicates the first availability of each of the plurality of products including the first photo-customized product, and wherein the consumer kiosk is configured to override the first availability of the first photo-customized product with the local availability of the first photo-customized product.

10. The auto product offering computer system of claim 5, wherein determining the local availability of the first photo-customized product in the plurality of products includes determining whether the one or more media items are loaded into the equipment, and that the equipment is online and operable to print the one or more media items onto the first photo-customized product.

11. The auto product offering computer system of claim 5, wherein the graphical user interface is displayed on the consumer kiosk or displayed on an application running on a mobile device.

12. The auto product offering computer system of claim 1, wherein the updated graphical user interface includes ranking the photo-customizable products, so that the photo-customizable products having a first inventory are displayed on the updated graphical user interface less prominently than the photo-customizable products having a second inventory that is greater than the first inventory.

13. An auto product offering computer system for facilitating a selection of a photo-customized product, the system comprising:

a consumer kiosk having a graphical user interface on a display device for selecting a photo-customized product, the consumer kiosk in communication with a catalog server having a catalog of photo-customizable products from which to select;

a remote product server in communication with the catalog server, the remote product server fulfilling orders for the photo-customizable products, the orders placed by users of the consumer kiosk;

a processor coupled to the consumer kiosk and the catalog server operating a product availability manager to determine whether products are available for fulfillment from the remote product server; and a local product server in communication with the consumer kiosk, the local product server fulfilling the orders for the photo-customizable products at or near a location of the consumer kiosk;

wherein the processor is configured to:

obtain a local availability of a first photo-customized product indicating whether or not the first photo-customized product is available at the local product server and first settings of the local product server indicating whether or not one or more media items are loaded into an equipment and the equipment to print the one or more media items on the first photo-customized product is available;

display the graphical user interface including a first product representation that is configured for the users of the consumer kiosk to select the first photo-customized product if the first photo-customized product is available at the local product server and the first settings of the local product server indicate that the one or more media items are loaded into the equipment and the equipment to print the one or more media items on the first photo-customized product is available, and display the graphical user interface including a second product representation for the users of the consumer kiosk to select a second photo-customized product that is other than the first photo-customized product, if the first settings indicate that at least one of the one or more media items are not loaded into the equipment that generates the first photo-customized product or the equipment that generates the first photo-customized product is not available, wherein the processor is further operating a product advertising manager that is configured to:

periodically determine if the first photo-customized product is eligible for at least one of promotions or advertising to the users of the consumer kiosk from second settings of the local product server indicating whether or not the first photo-customized product is eligible for the at least one of promotions or advertising;

display an updated graphical user interface including a third product representation including at least one of promotions or advertising information with the first product representation if the second settings of the local product server indicate that the first photo-customized product is eligible for the at least one of promotions or advertising;

display the graphical user interface including the first product representation if the second settings of the local product server indicate that the first photo-customized product is not eligible for the at least one of promotions or advertising;

obtain, a first availability of the first photo-customized product indicating that the first photo-customized product is available on the remote product server;

override the first availability of the first photo-customized product with the local availability of the first photo-customized product when the local availability indicates that the first photo-customized product is available at the local product server, the first settings of the local product server indicate that the one or more media items are loaded into the equipment and the equipment to print the one or more media items onto the first photo-customized product is available; and adjust the graphical user interface to generate the orders to print the one or more media items onto the first photo-customized product that is locally available at the equipment.

14. The auto product offering computer system of claim 13, wherein the graphical user interface of the consumer kiosk is operable on a mobile device operated by user of the consumer kiosk, the mobile device in communication with any one or more of the catalog server and the local product server.

15. The auto product offering computer system of claim 13 wherein the consumer kiosk is operable to receive an order for the first photo-customized product using the graphical user interface (GUI).

16. The auto product offering computer system of claim 13, wherein the updated the graphical user interface includes ranking the photo-customizable products, so that the photo-customizable products having a first inventory are displayed on the updated graphical user interface less prominently than the products having a second inventory that is greater than the first inventory.

* * * * *